Patented Jan. 8, 1929.

1,697,857

UNITED STATES PATENT OFFICE.

RICHARD W. DYER, OF NEWFIELD, NEW JERSEY.

MEAT PASTE AND METHOD OF MAKING THE SAME.

No Drawing.  Application filed December 5, 1927. Serial No. 237,986.

My invention relates to the manufacture of a pâté or meat paste from domestic fowl such as pigeons and chickens, ducks, turkeys, geese and guinea fowl. The bones of fowl consist largely of gelatinous material or gristle filling the interstices of a skeleton of phosphate of lime which skeleton or framework of the bones is so friable when the gelatinous material has been dissolved out or reduced to a paste like consistency by proper cooking that it is readily broken up into fine particles and I have discovered that by cooking such birds under conditions which will dissolve out of their bones the gelatinous material thereof or reduce it to a paste like consistency and grinding together the cooked flesh, the marrow and the softened bones, a pâté or meat paste is produced of a highly desirable texture, flavor and nutritive value and my invention consists in the meat paste so made and in the process of making it.

The cooking should be under conditions which will not so dry the flesh of the birds as to remove the solvent liquids which, under proper conditions, dissolve out the gelatinous constituents of the bones, and also for the best results under conditions which will form rich meat juices to be mixed with the flesh and bone material to form a rich pâté. In practice, I cook a large number of birds together in a steam jacketed closed kettle, adding at the beginning a small quantity of water to prevent the birds from sticking to the walls of the kettle, and raising the temperature to about 260° F. at which temperature I find that the bone structure is so far freed of its gelatinous constituents after about two to three hours cooking that the residue will mix freely with the flesh and juices into a smooth paste. At lower temperatures the cooking operation must be prolonged.

The birds may be ground into a fine state of comminution either before or after cooking but it will be understood that after cooking it is necessary that the flesh, bone framework, meat juices and marrow must be so thoroughly mixed together as to form a homogeneous paste and this is best effected by a grinding operation after cooking, followed by an energetic mixing in a mixing machine, during which operation I incorporate any desired seasoning, though this can be done, if desired, at an earlier stage of the process. The paste on completion is packed in hermetically sealed containers with the usual sterilizing precaution.

It will be understood that for the best results the birds should be cooked under conditions which will keep them saturated with the meat juices and under conditions which will preserve all the juices including the dissolved gelatin from the bone structure and these juices should be ground up with the cooked flesh and softened bones and marrow to form my meat paste. The bone structure of fowls is such that my process can be applied to and my new product obtained from fowls of all ages. In practice I have chiefly used young fowl which I find are suitable for my use at about the age at which they are first generally considered eatable. With such young fowl the bone structure is highly gelatinous and the phosphate of lime constituent is very easily comminuted after suitable cooking.

While, as I have said, I prefer to incorporate all of the meat juices in my paste, it will be obvious that a portion of the meat juices may, if desired, be separated from the cooked mass and used for other purposes without material departure from my process or variation of the pâté produced.

Having now described my invention, what I claim as new and desire to secure by Letters Patent, is:

1. The method of manufacturing a food paste which consists in cooking domestic fowls under conditions which will dissolve and soften the gelatinous constituents of the bones and leave the phosphate of lime bone framework in a friable condition, comminuting the flesh and bones by grinding and intermixing the ground flesh, softened bones and marrow to the form of a homogeneous paste.

2. The method of claim 1, in which the cooking of the fowl is carried on in a closed receptacle at temperatures above 212° F.

3. The method of manufacturing a food paste which consists in cooking domestic fowls under conditions which will dissolve and soften the gelatinous constituents of the bones and leave the phosphate of lime bone framework in a friable condition, comminuting the flesh and bones by grinding and intermixing the ground flesh and softened bones together with the cooked meat juices and marrow to the form of a homogeneous paste.

4. A food paste consisting of the cooked and comminuted flesh, the softened and comminuted bones and the marrow of domestic fowls intermixed and incorporated with each other into a homogeneous paste.

5. A food paste consisting of the cooked and comminuted flesh, the softened and comminuted bones and the cooked meat juices and the marrow of domestic fowls intermixed and incorporated with each other into a homogeneous paste.

RICHARD W. DYER.